United States Patent
Kim et al.

(10) Patent No.: US 9,207,383 B2
(45) Date of Patent: Dec. 8, 2015

(54) BACKLIGHT UNIT AND LIQUID CRYSTAL DISPLAY DEVICE USING THE SAME

(71) Applicant: LG DISPLAY CO., LTD., Seoul (KR)

(72) Inventors: Young Sam Kim, Gyeongbuk (KR); Byeong-Ryeol Seo, Gumi-si (KR); Seungwoo Lim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/968,090

(22) Filed: Aug. 15, 2013

(65) Prior Publication Data

US 2014/0063414 A1    Mar. 6, 2014

(30) Foreign Application Priority Data

Aug. 31, 2012  (KR) .................. 10-2012-0096035
May 23, 2013   (KR) .................. 10-2013-0058324

(51) Int. Cl.
*G02F 1/1335* (2006.01)
*F21V 8/00* (2006.01)

(52) U.S. Cl.
CPC ............ *G02B 6/0041* (2013.01); *G02B 6/0035* (2013.01); *G02B 6/0036* (2013.01); *G02B 6/0038* (2013.01); *G02B 6/0053* (2013.01); *G02F 1/133615* (2013.01); *G02B 6/0055* (2013.01)

(58) Field of Classification Search
CPC ............ G02F 1/133615; G02B 6/0036; G02B 6/0038; G02B 6/0055; G02B 6/0041; G02B 6/0035; G02B 6/0053
USPC ...................................................... 349/61–68
See application file for complete search history.

(56) References Cited

U.S. PATENT DOCUMENTS

| | | | |
|---|---|---|---|
| 5,961,198 A * | 10/1999 | Hira et al. ..................... 362/621 |
| 2007/0002587 A1 | 1/2007 | Miyashita | |
| 2007/0035680 A1* | 2/2007 | Watanuki et al. ............... 349/61 |
| 2008/0239204 A1* | 10/2008 | Lee et al. ......................... 349/65 |
| 2009/0021668 A1* | 1/2009 | Cheng et al. .................... 349/65 |
| 2009/0207344 A1* | 8/2009 | Ono et al. ........................ 349/65 |
| 2010/0277669 A1* | 11/2010 | Adachi et al. ................... 349/62 |

FOREIGN PATENT DOCUMENTS

CN    1678866 A    10/2005

* cited by examiner

*Primary Examiner* — Charles Chang
(74) *Attorney, Agent, or Firm* — Birch, Stewart, Kolasch & Birch, LLP

(57) ABSTRACT

Discussed are a backlight unit and an LCD device using the same. The backlight unit according to an embodiment includes a light source; a light guide plate facing the light source; a plurality of protrusion patterns provided on the bottom of the light guide plate; an optical sheet disposed on the light guide plate; and a reflector disposed under the light guide plate, wherein each of the plurality of protrusion patterns has a cross-sectional structure comprising a first side that is a portion of the bottom of the light guide plate, a second side that extends from one end of the first side, and a third side that extends from the other end of the first side.

19 Claims, 11 Drawing Sheets

(a)

(b)

(a)

(b)

(a)

(b)

(c)

BACKLIGHT UNIT AND LIQUID CRYSTAL DISPLAY DEVICE USING THE SAME

CROSS-REFERENCE TO RELATED APPLICATIONS

This application claims the benefit of the Korean Patent Application No. 10-2012-0096035 filed on Aug. 31, 2012 and the Korean Patent Application No. 10-2013-0058324 filed on May 23, 2013, which are hereby incorporated by reference as if fully set forth herein.

BACKGROUND

1. Field of the Invention

The present invention relates to a liquid crystal display (LCD) device, and more particularly, to an LCD device including an edge type backlight unit.

2. Discussion of the Related Art

Generally, since LCD devices are driven with a low operating voltage, the LCD devices have low power consumption and are used as portable devices. Accordingly, the LCD devices are widely applied to various fields such as notebook computers, monitors, spacecrafts, airplanes, etc.

LCD devices include a lower substrate, an upper substrate, and a liquid crystal layer formed therebetween. In the LCD devices, the alignment of liquid crystal in the liquid crystal layer is adjusted with an electric field applied thereto, and thus, a light transmittance is adjusted, thereby displaying an image.

The LCD devices are non-emitting display devices that cannot self-emit light unlike other self-emitting flat panel display devices, and thus, a backlight unit is disposed as a light source in the rear of a liquid crystal panel. The backlight unit is largely categorized into a direct type and an edge type.

The direct type is a type in which lamps are disposed all over a bottom of the liquid crystal panel, and light emitted from the lamps is directly transferred to the liquid crystal panel. The edge type is a type in which the lamps are disposed at one side of the bottom of the liquid crystal panel, and light emitted from the lamps is transferred to the liquid crystal panel by a light guide plate.

Hereinafter, a related art LCD device including the edge type backlight unit will be described with reference to the drawing.

FIG. 1 is a cross-sectional view schematically illustrating a related art LCD device.

As seen in FIG. 1, the related art LCD device includes a backlight unit 1 and a liquid crystal panel 2.

The backlight unit 1 includes a light guide plate 10, a light source 20, an optical sheet 30, and a reflector 40.

The light guide plate 10 changes a traveling path of light emitted from the light source 20 in order for the light to be transferred to the liquid crystal panel 2. To change a traveling path of light in this way, a protrusion pattern 11 is formed at a bottom of the light guide plate 10. The protrusion pattern 11 is formed in a circular dot structure.

The light source 20 is disposed to face one side surface of the light guide plate 10. The light source 20 includes a light emitting diode (LED), a fluorescent lamp, or the like.

The optical sheet 30 allows light, passing through a top of the light guide plate 10, to be uniformly incident on the liquid crystal panel 2. The optical sheet 30 is configured with two prism sheets and one diffusive sheet.

The reflector 40 is disposed under the light guide plate 10, and reflects light passing through the bottom of the light guide plate 10, thereby allowing the light to be re-incident on the light guide plate 10.

The liquid crystal panel 2 includes a lower substrate 50, an upper substrate 60, and a liquid crystal layer (not shown) formed therebetween.

In the related art LCD device, light emitted from the light source 20 is reflected by the protrusion pattern 11 which is formed in the circular dot structure in the light guide plate 10, and thus, a traveling path of the light is changed toward the liquid crystal panel 2. However, in a case using the light guide plate 10 of the related art, an amount of light reflected by the circular dot structure is limited, and for this reason, there is a limitation in enhancing a light efficiency.

SUMMARY

Accordingly, the present invention is directed to provide an LCD device including an edge type backlight unit that substantially obviates one or more problems due to limitations and disadvantages of the related art.

An aspect of the present invention is directed to provide a backlight unit and an LCD device using the same, which can more enhance a light efficiency.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a backlight unit including: a light source; a light guide plate facing the light source; a plurality of protrusion patterns provided on the bottom of the light guide plate; an optical sheet disposed on the light guide plate; and a reflector disposed under the light guide plate, wherein the light guide plate comprises a first side surface that faces the light source and acts as a light incident surface; a second side surface that is opposite to the first side surface; a bottom that faces the reflector; and a top that is opposite to the bottom and acts as a light output surface; wherein each of the plurality of protrusion patterns has a cross-sectional structure comprising a first side that is a portion of the bottom of the light guide plate, a second side that extends from one end of the first side, and a third side that extends from the other end of the first side, and wherein the second side is a side close to the light source, the third side is a side far away from the light source, and a second angle between the first side and the third side is smaller than a first angle between the first side and the second side.

In another aspect of the present invention, there is provided an LCD device including: a backlight unit; and a liquid crystal panel disposed on the backlight unit, wherein, the backlight unit including: a light source; a light guide plate facing the light source; a plurality of protrusion patterns provided on the bottom of the light guide plate; an optical sheet disposed on the light guide plate; and a reflector disposed under the light guide plate, wherein the light guide plate comprises a first side surface that faces the light source and acts as a light incident surface; a second side surface that is opposite to the first side surface; a bottom that faces the reflector; and a top that is opposite to the bottom and acts as a light output surface; wherein each of the plurality of protrusion patterns has a cross-sectional structure comprising a first side that is a portion of the bottom of the light guide plate, a second side that extends from one end of the first side, and a third side that extends from the other end of the first side, and wherein the second side is a side close to the light source, the third side is a side far away from the light source, and a second angle between the first side and the third side is smaller than a first angle between the first side and the second side.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 2:
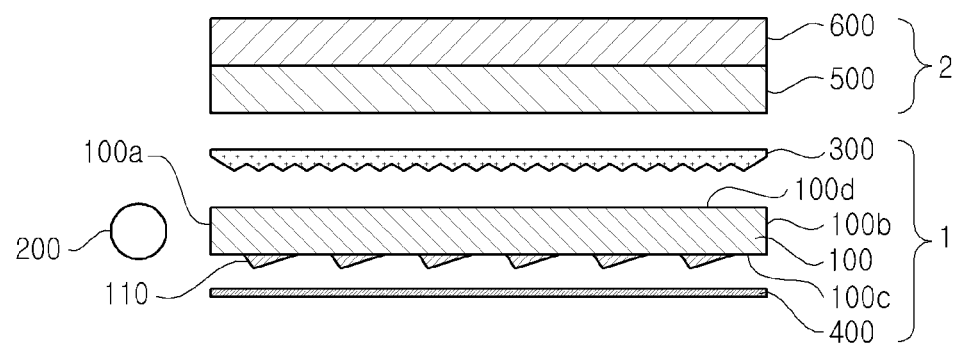
FIG. 2 is a cross-sectional view schematically illustrating an LCD device according to an embodiment of the present invention.

FIG. 2 is a cross-sectional view schematically illustrating an LCD device according to an embodiment of the present invention.

As seen in FIG. 2, the LCD device according to an embodiment of the present invention includes a backlight unit 1 and a liquid crystal panel 2.

The backlight unit 1 includes a light guide plate 100, a light source 200, an optical sheet 300, and a reflector 400.

The light guide plate 100 is disposed to face the light source 200, and changes a traveling path of light emitted from the light source 200 in order for the light to be transferred to the liquid crystal panel 2.

The light guide plate 100 includes a first side surface 100a that faces the light source 200 and acts as a light incident surface, a second side surface 100b opposite to the first side surface 100a, a bottom 100c that faces the reflector 400, and a top 100d that is opposite to the bottom 100c and acts as a light output surface. A height of the first side surface 100a may be the same as that of the second side surface 100b, and thus, the light guide plate 100 may be formed as a plate of an overall uniform thickness.

A protrusion pattern 110 for changing a traveling path of light is formed at the bottom 100c of the light guide plate 100. An overall configuration of the protrusion pattern 110 will be described below.

The light source 200 is disposed to face the first side surface 100a of the light guide plate 100. The light source 200 may be configured as a dot light source such as an LED, or configured as a line light source such as a fluorescent lamp.

The optical sheet 300 is disposed on the light guide plate 100. The optical sheet 300 allows light, passing through the top 100d of the light guide plate 100, to be uniformly incident on the liquid crystal panel 2. The optical sheet 300 may be a prism sheet. More specifically, the optical sheet 300 may be a reverse prism sheet in which a prism structure is disposed to face the top 100d of the light guide plate 100.

The reflector 400 is disposed under the light guide plate 100, and allows light, passing through the bottom 100c of the light guide plate 100, to be re-incident on the light guide plate 100.

The liquid crystal panel 2 includes a lower substrate 500, an upper substrate 600, and a liquid crystal layer (not shown) formed therebetween.

Although not shown, a plurality of gate lines and a plurality of data lines that intersect each other to define a plurality of pixel areas are formed on the lower substrate 500, and a pixel electrode is formed in each of the plurality of pixel areas.

Also, a plurality of black matrixes for preventing a leakage of light are formed on the upper substrate 600, and a red (R) color filter, a green (G) color filter, and a blue (B) color filter are respectively formed between the plurality of black matrixes. An overall configuration of the lower substrate 500 and upper substrate 600 may be changed to various types known to those skilled in the art, depending on a driving mode of the liquid crystal panel 2, for example, a twisted nematic (TN) mode, a vertical alignment (VA) mode, an in-plane switching (IPS) mode, or a fringe field switching (FFS) mode.

Figure 3:
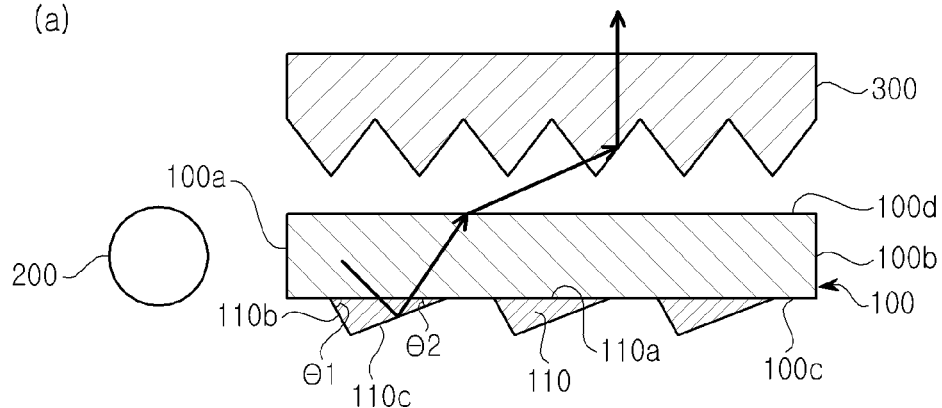
FIG. 3(a) illustrates a cross-sectional plane of each of a light guide plate and an optical sheet according to an embodiment of the present invention.
FIG. 3(b) illustrates a bottom of the light guide plate according to an embodiment of the present invention.
Figure 3:
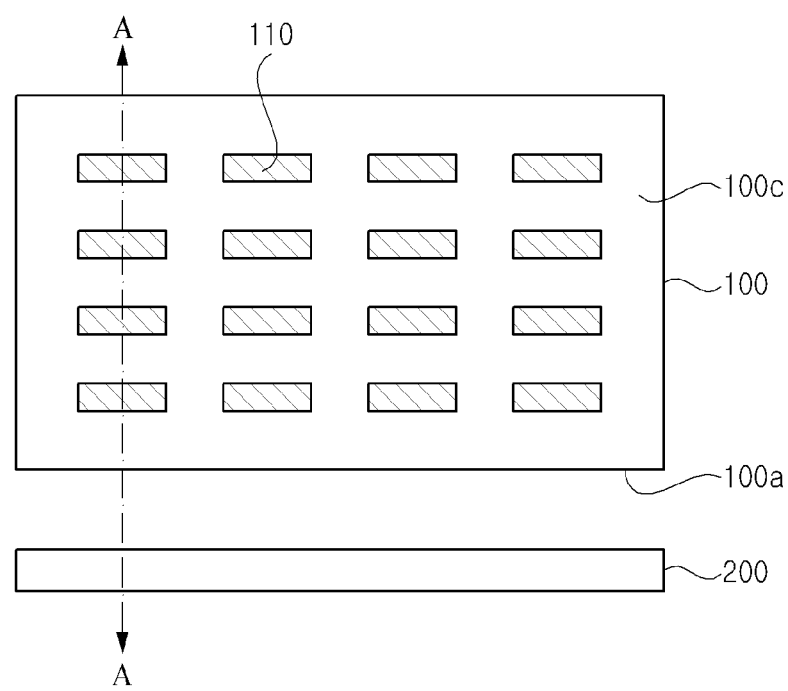

FIG. 3(*a*) illustrates a cross-sectional plane of each of the light guide plate 100 and the optical sheet 300 according to an embodiment of the present invention, and FIG. 3(*b*) illustrates the bottom 100*c* of the light guide plate 100 according to an embodiment of the present invention. The light guide plate 100 of FIG. 3(*a*) corresponds to a cross-sectional plane taken along A-A line of FIG. 3(*b*).

As seen in FIGS. 3(*a*) and 3(*b*), a protrusion pattern 100 is formed at the bottom 100*c* of the light guide plate 100.

As seen in FIG. 3(*a*), the protrusion pattern 110 is formed in a triangular cross-sectional structure at the bottom 100*c* of the light guide plate 100. In particular, the protrusion pattern 110 includes a first side 110*a* that is a portion of the bottom 100*c* of the light guide plate 100, a second side 110*b* that extends from one end of the first side 110*a*, and a third side 110*c* that extends from the other end of the first side 110*a* and contacts the second side 110*b*. The second side 110*b* is a side close to the light source 200, and the third side 110*c* is a side far away from the light source 200.

In this case, a second angle "θ2" between the first side 110*a* and the third side 110*c* is set smaller than a first angle "θ1" between the first side 110*a* and the second side 110*b*. Light emitted from the light source 200 is reflected by the third side 110*c* to travel toward the top 100*d* of the light guide plate 100. When the second angle "θ2" is set smaller than the first angle "θ1", an amount of light traveling to the top 100*d* of the light guide plate 100 can increase. Especially, the second angle "θ2" may be greater than 0 degrees and smaller than 10 degrees, preferably, 1 to 5 degrees, thus easily increasing an amount of light traveling to the top 100*d* of the light guide plate 100.

As seen in FIG. 3(*b*), a plurality of the protrusion patterns 110 are separated from each other at certain intervals in a X-direction and a Y-direction at the bottom 100*c* of the light guide plate 100, and the protrusion patterns 110 is overall formed in a tetragonal plane structure, especially, a rectangular plane structure.

Referring again to FIG. 3(*a*), the optical sheet 300 is formed on the top 100*d* of the light guide plate 100. The optical sheet 300 may be a reverse prism sheet in which a prism pattern is formed to face the top 100*d* of the light guide plate 100.

Figure 1:
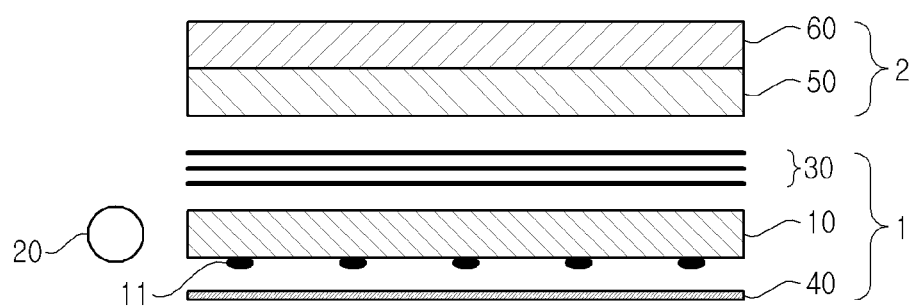
FIG. 1 is a cross-sectional view schematically illustrating a related art LCD device.

The reverse prism sheet changes a traveling path of light emitted through the top 100*d* of the light guide plate 100 in order for the light to travel vertically to the liquid crystal panel. As seen in FIG. 1, the related art needs two prism sheets disposed on the top of the light guide plate 10, but in the present invention, a directionality of light emitted through the top of the light guide plate 10 is improved by using the light guide plate 100 including the protrusion patterns 110, thus enabling one reverse prism sheet to be used as the optical sheet 300. In addition, although not shown, a diffusive sheet or a dual brightness enhancement film (DBEF) may be additionally provided at a top of the reverse prism sheet.

Figure 4:
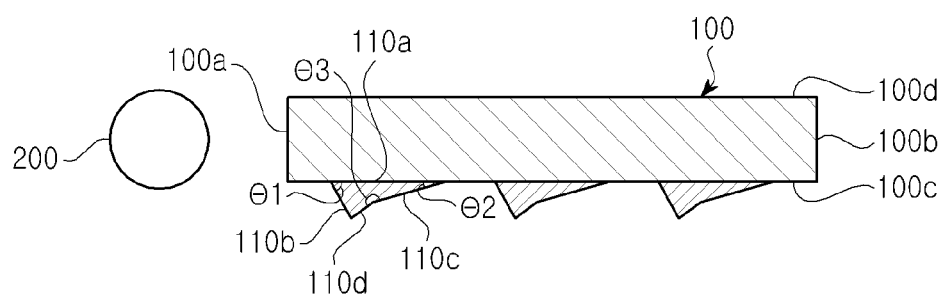
FIG. 4 illustrates a cross-sectional plane of a light guide plate according to another embodiment of the present invention.

FIG. 4 illustrates a cross-sectional plane of a light guide plate 100 according to another embodiment of the present invention.

As seen in FIG. 4, a protrusion pattern 110 formed at the bottom 100*c* of the light guide plate 100 has a tetragonal cross-sectional structure. In particular, the protrusion pattern 110 includes a first side 110*a* that is a portion of the bottom 100*c* of the light guide plate 100, a second side 110*b* that extends from one end of the first side 110*a*, a third side 110*c* that extends from the other end of the first side 110*a*, and a fourth side 110*d* that connects the second side 110*b* to the third side 110*c*. The second side 110*b* is a side close to the light source 200, and the third side 110*c* is a side far away from the light source 200.

In this case, a second angle "θ2" between the first side 110*a* and the third side 110*c* is set smaller than a first angle "θ1" between the first side 110*a* and the second side 110*b*. Especially, the second angle "θ2" may be greater than 0 degrees and smaller than 10 degrees, preferably, 1 to 5 degrees. Also, a third angle "θ3" between the third side 110*c* and the fourth side 110*d* is set to be greater than 180 degrees and smaller than 270 degrees. By using the protrusion pattern 110 of FIG. 4, light emitted from the light source 200 is reflected at various angles by the third side 110*c* and fourth side 110*d* of the protrusion pattern 110, and thus, light can be more uniformly emitted toward the top 100*d* of the light guide plate 100.

Figure 5:
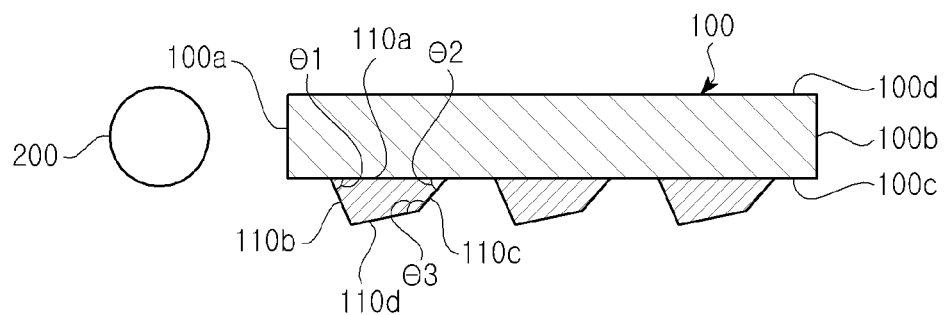
FIG. 5 illustrates a cross-sectional plane of a light guide plate according to another embodiment of the present invention.

FIG. 5 illustrates a cross-sectional plane of a light guide plate 100 according to another embodiment of the present invention. Except that the angle "θ3" between the third side 110*c* and the fourth side 110*d* is changed, the light guide plate 100 of FIG. 5 is the same as the light guide plate 100 of FIG. 4. Therefore, only different elements will now be described.

As seen in FIG. 5, the angle "θ3" between the third side 110*c* and the fourth side 110*d* is set to be greater than 90 degrees and smaller than 180 degrees. Similarly to FIG. 4, in FIG. 5, light emitted from the light source 200 is reflected at various angles by the third side 110*c* and fourth side 110*d* of the protrusion pattern 110, and thus, light can be more uniformly emitted toward the top 100*d* of the light guide plate 100.

Figure 6:
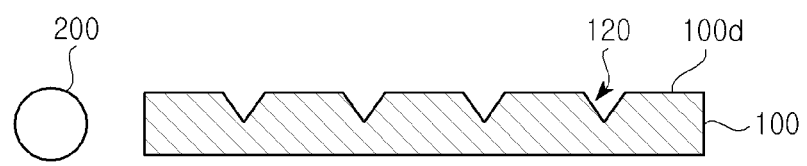
FIG. 6(a) illustrates a cross-sectional plane of a light guide plate according to another embodiment of the present invention.
FIG. 6(b) illustrates a top of the light guide plate according to another embodiment of the present invention.
Figure 6:
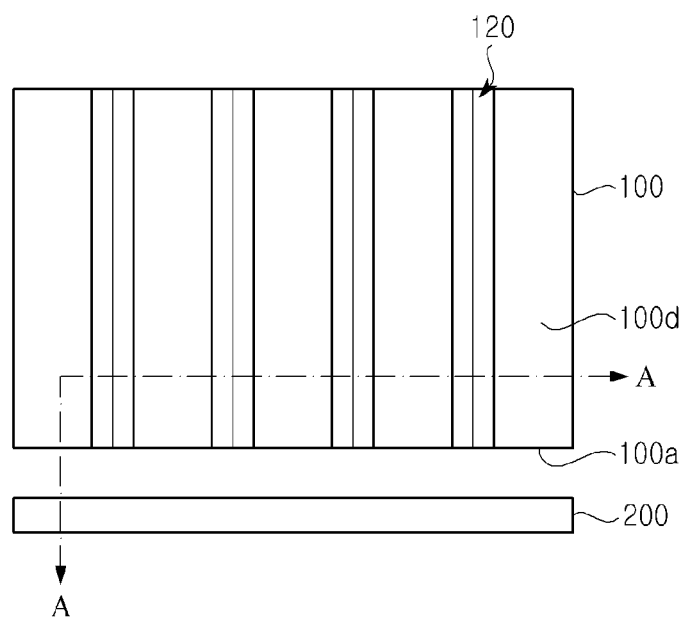

FIG. 6(*a*) illustrates a cross-sectional plane of a light guide plate 100 according to another embodiment of the present invention, and FIG. 6(*b*) illustrates a top 100*d* of the light guide plate 100 according to another embodiment of the present invention. FIG. 6(*a*) corresponds to a cross-sectional plane taken along A-A line of FIG. 6(*b*), and particularly, illustrates a cross-sectional plane of an area in which the protrusion pattern 110 is not formed.

Except that a structure of the top 100*d* of the light guide plate 100 is changed, the light guide plate 100 of FIGS. 6(*a*) and 6(*b*) is the same as the light guide plate 100 of FIGS. 3(*a*) and 3(*b*). Therefore, only different elements will now be described.

As seen in FIGS. 6(*a*) and 6(*b*), a concave pattern 120 is formed at the top 100*d* of the light guide plate 100.

The concave pattern 120 may be formed in a straight line structure vertical to the first side surface 100*a* facing the light source 200, and a plurality of the concave patterns 120 having the straight line structure may be arranged at certain intervals to have a stripe structure. Like this, the concave pattern 120 is formed at the top 100*d* of the light guide plate 100, thus enhancing the spread of light emitted through the top 100*d* of the light guide plate 100. The concave patterns 120 may be formed in a triangular cross-sectional structure.

Figure 7:
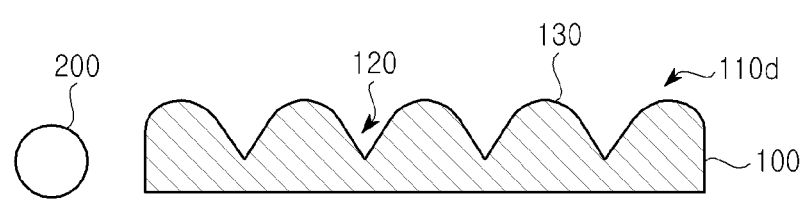
FIG. 7(a) illustrates a cross-sectional plane of a light guide plate according to another embodiment of the present invention.
FIG. 7(b) illustrates a top of the light guide plate according to another embodiment of the present invention.
Figure 7:
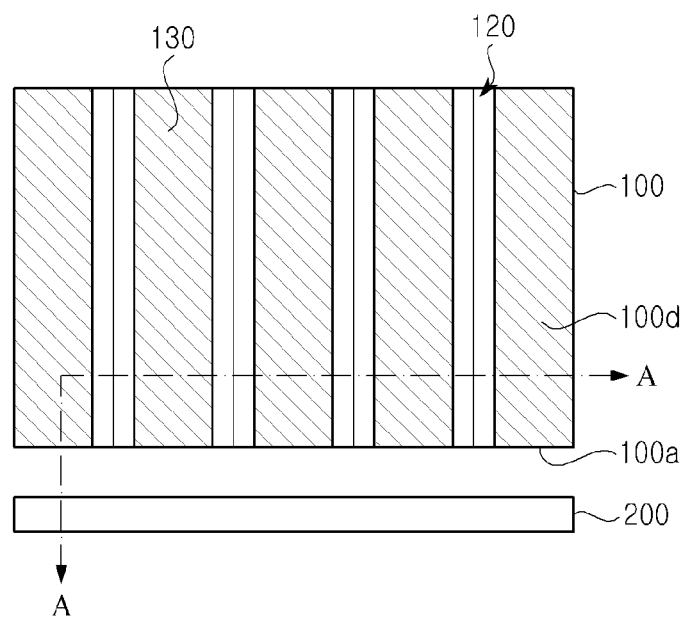

FIG. 7(*a*) illustrates a cross-sectional plane of a light guide plate 100 according to another embodiment of the present invention, and FIG. 7(*b*) illustrates a top 100*d* of the light guide plate 100 according to another embodiment of the present invention. FIG. 7(*a*) corresponds to a cross-sectional plane taken along A-A line of FIG. 7(b), and particularly, illustrates a cross-sectional plane of an area in which the protrusion pattern 110 is not formed.

Except that a structure of an area between the concave patterns 120 formed at the top 100d of the light guide plate 100 is changed, the light guide plate 100 of FIGS. 7(a) and 7(b) is the same as the light guide plate 100 of FIGS. 6(a) and 6(b). Therefore, only different elements will now be described.

As seen in FIGS. 7(a) and 7(b), a concave pattern 120 is formed at the top 100d of the light guide plate 100, and a convex pattern 130 is formed between adjacent concave patterns 120. The convex pattern 130 may be formed in a straight line structure vertical to the first side surface 100a facing the light source 200, and a plurality of the convex patterns 130 having the straight line structure may be arranged at certain intervals to have a stripe structure. As a result, the concave patterns 120 and the convex patterns 130 may be alternately disposed. Like this, since the concave patterns 120 and the convex patterns 130 may be alternately disposed, the spread of light emitted through the top 100d of the light guide plate 100 can be more enhanced. The convex patterns 120 may be formed in a curved cross-sectional structure.

Figure 8:
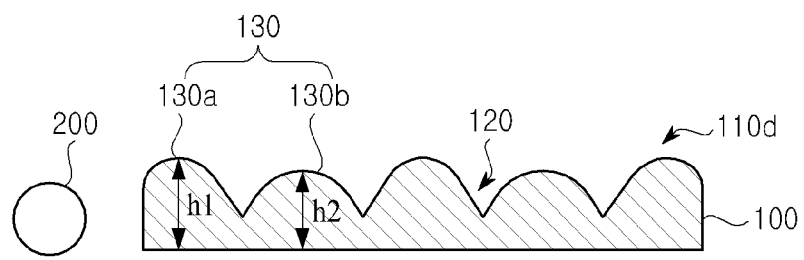
FIG. 8 illustrates a cross-sectional plane of a light guide plate according to another embodiment of the present invention.

FIG. 8 illustrates a cross-sectional plane of a light guide plate 100 according to another embodiment of the present invention. Except that a structure of the convex patterns 130 is changed, the light guide plate 100 of FIG. 8 is the same as the light guide plate 100 of FIGS. 7(a) and 7(b).

According to FIGS. 7(a) and 7(b), the plurality of convex patterns 130 are all formed in the same shape, but according to FIG. 8, the plurality of convex patterns 130 are not all formed in the same shape. That is, as seen in FIG. 8, the plurality of convex patterns 130 include a first convex pattern 130a and a second convex pattern 130b that have different heights. In particular, a height h1 of the first convex pattern 130a is higher than a height h2 of the second convex pattern 130b.

Like this, since the first and second convex patterns 130a and 130b having different heights are formed, the spread of light emitted through the top 100d of the light guide plate 100 can be more enhanced.

Figure 9:
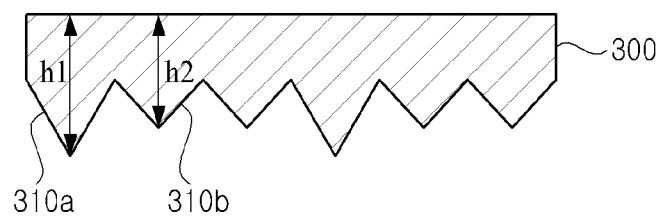
FIG. 9 illustrates a cross-sectional plane of an optical sheet according to an embodiment of the present invention.

FIG. 9 illustrates a cross-sectional plane of the optical sheet 300 according to an embodiment of the present invention.

As seen in FIG. 9, the optical sheet 300 is a reverse prism sheet. Here, a plurality of prisms include a first prism pattern 310a and a second prism pattern 310b that have different heights. That is, a height h1 of the first prism pattern 310a is higher than a height h2 of the second prism pattern 310b.

Like this, since the first and second prism patterns 310a and 310b having different heights are formed, light can be more uniformly transferred toward the liquid crystal panel.

Figure 10:
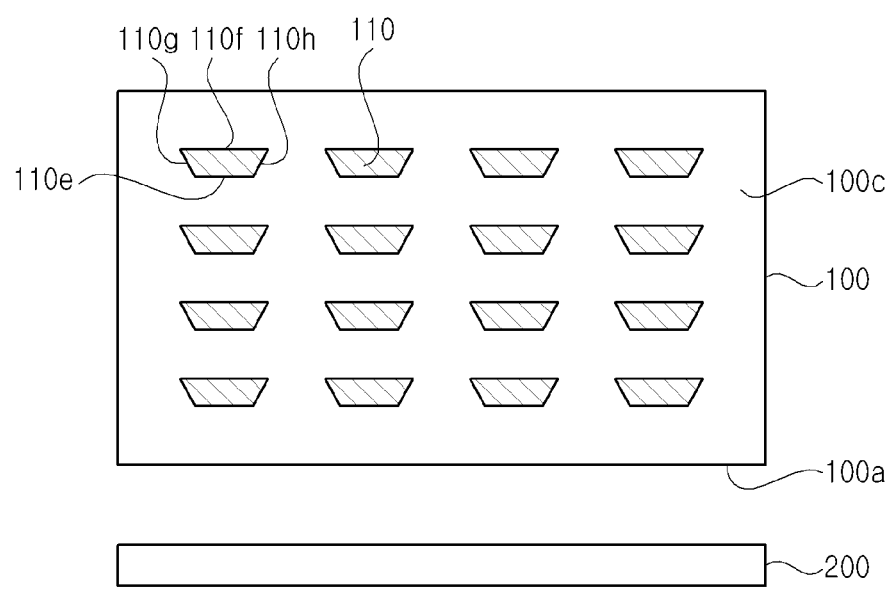
FIG. 10 illustrates a bottom of a light guide plate according to another embodiment of the present invention.

FIG. 10 illustrates a bottom of a light guide plate 100 according to another embodiment of the present invention.

As seen in FIG. 3(b), a plurality of the protrusion patterns 110 are separated from each other at certain intervals in a X-direction and a Y-direction at the bottom 100c of the light guide plate 100, and the protrusion patterns 110 is overall formed in a rectangular plane structure.

On the other hand, according to FIG. 10, the protrusion patterns 110 are overall formed in a trapezoid plane structure. More specifically, a fifth side 110e close to the light source 200 is parallel to a sixth side 110f opposite thereto, and a seventh side 110g and an eighth side 110h that connect the fifth side 110e to the sixth side 110f are not parallel to each other. Especially, a length of the fifth side 110e is shorter than that of the sixth side 110f.

By using the protrusion patterns 110 having the above-described structure, light emitted from the light source 200 is spread to a broad range in the light guide plate 100. Particularly, when a dot light source such as an LED is used as the light source 200, there can be an area to which light emitted from the dot light source is not transferred in the light guide plate 100, but by using the protrusion patterns 110 of FIG. 10, light is spread to a broad range and thus can minimize an area to which light is not transferred in the light guide plate 100.

Figure 11:
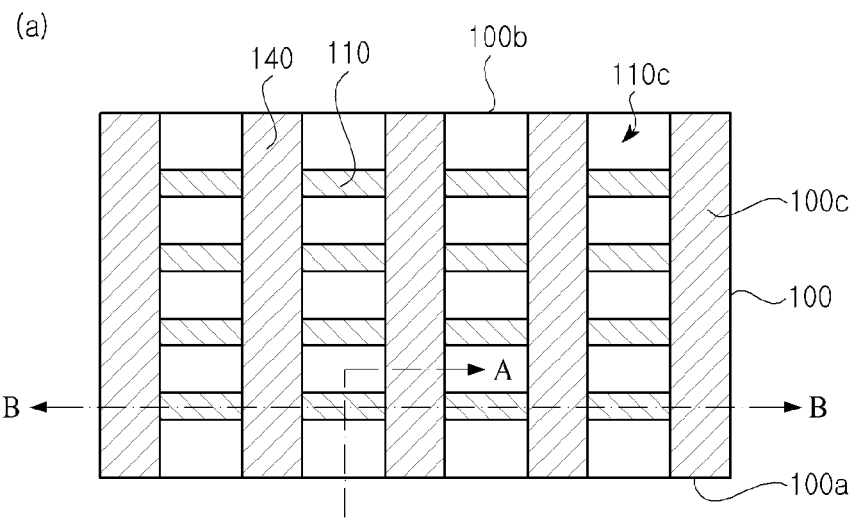
FIG. 11(a) illustrates a bottom of a light guide plate according to another embodiment of the present invention.
FIG. 11(b) is a cross-sectional view taken along A-A line of FIG. 11(a)
FIG. 11(c) is a cross-sectional view taken along B-B line of FIG. 11(a)
Figure 11:
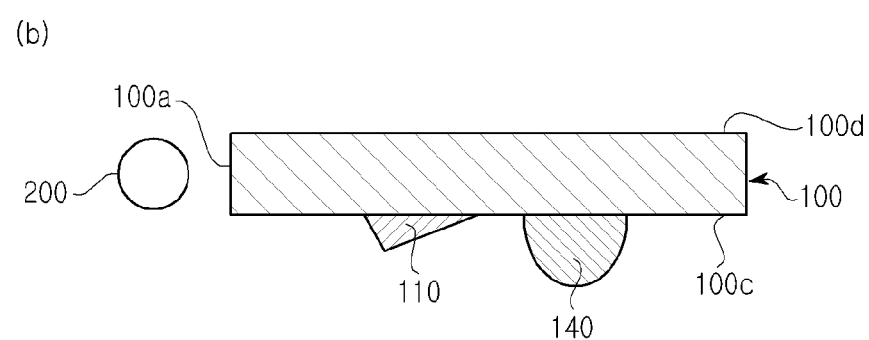
Figure 11:
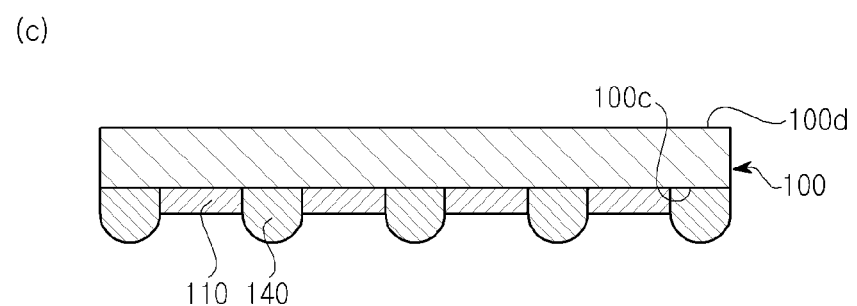

FIG. 11(a) illustrates a bottom of a light guide plate 100 according to another embodiment of the present invention, FIG. 11(b) is a cross-sectional view taken along A-A line of FIG. 11(a), and FIG. 11(c) is a cross-sectional view taken along B-B line of FIG. 11(a).

Except that a structure of an area between the protrusion patterns 110 formed at the bottom 100c of the light guide plate 100 is changed, the light guide plate 100 of FIGS. 11(a) to 11(c) is the same as the light guide plate 100 of FIGS. 3(a) and 3(b). Therefore, only different elements will now be described.

As seen in FIGS. 11(a) to 11(c), a plurality of the protrusion patterns 110 are separated from each other at certain intervals in a X-direction and a Y-direction at the bottom 100c of the light guide plate 100.

Moreover, a plurality of protective patterns 140 are formed in respective areas between the plurality of protrusion patterns 110. The protective patterns 140 protect the protrusion patterns 110.

As described above, light emitted from the light source 200 is reflected by the protrusion patterns 110, and thus, if a crack occurs in the protrusion patterns 110, a light efficiency is reduced. Generally, a pressure can be applied to the backlight unit by a user's hand or various causes in using the LCD device, in which case damage such as a crack can occur in the protrusion patterns 110.

Therefore, in the embodiment of FIGS. 11(a) to 11(c), by additionally forming the plurality of protective patterns 140 in respective areas between the plurality of protrusion patterns 110, even though a pressure is applied to the backlight unit, the protective patterns 140 absorb the pressure, thus preventing the protrusion patterns 110 from being damaged.

The protective patterns 140 having the above-described function are disposed higher in position than the height of the protrusion patterns 110. Also, the protective patterns 140 may preferably have a curved cross-sectional plane. The reason is because when the cross-sectional plane of each of the protective patterns 140 is formed in a curved shape, the protective patterns 140 can be prevented from being adhered to the reflector (see reference numeral 400 in FIG. 2) disposed thereunder.

Moreover, the protective patterns 120 may be formed in a straight line structure vertical to the first side surface 100a of the light guide plate 100, and the protective patterns 120 having the straight line structure may be arranged at certain intervals to overall have a stripe structure, but is not limited thereto.

Figure 12:
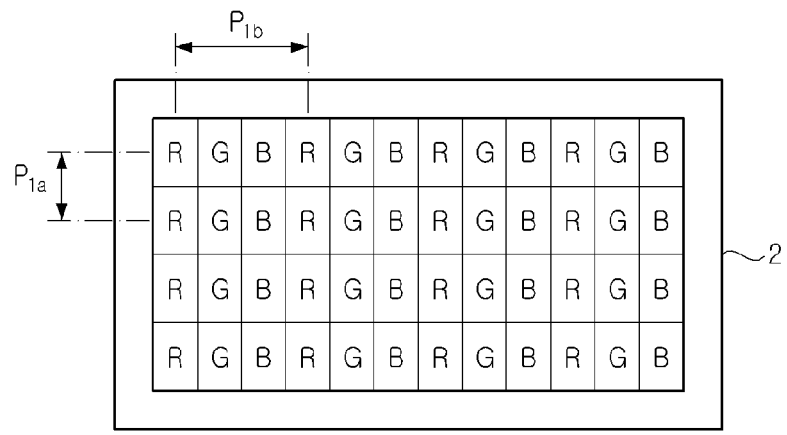
FIGS. 12(a) to 12(c) are views for describing a method of designing an LCD device according to an embodiment of the present invention.
Figure 12:
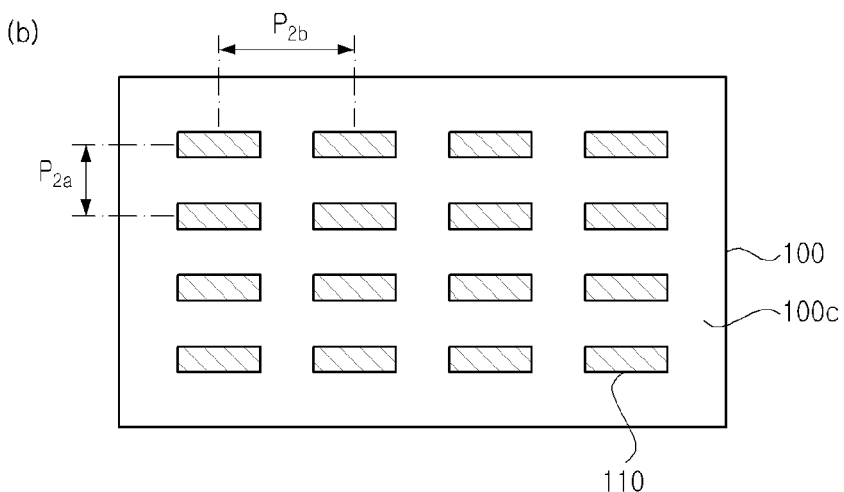
Figure 12:
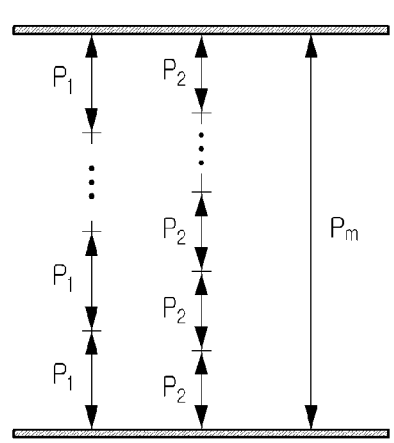

FIGS. 12(a) to 12(c) are views for describing a method of designing an LCD device according to an embodiment of the present invention. FIG. 12(a) is a plan view schematically illustrating a liquid crystal panel according to an embodiment of the present invention. FIG. 12(b) is a plan view schematically illustrating a light guide plate according to an embodiment of the present invention. FIG. 12(c) illustrates a method of designing a protrusion pattern of the light guide plate according to an embodiment of the present invention.

Generally, when two waves having different pitches are combined, interference can occur, and cause moire. In LCD devices, when light emitted from a light source is reflected by a plurality of protrusion patterns formed at a bottom of a light guide plate to travel toward an upper portion, one wave having a pitch between the protrusion patterns is generated. And, when the light transferred to a liquid crystal panel passes through a plurality of pixels arranged in a matrix structure, the other wave having a pitch between the pixels is generated.

Therefore, the moire can occur by a combination of the one wave having the pitch between the protrusion patterns and the other wave having the pitch between the pixels.

FIGS. 12(a) to 12(c) relate to a method of designing an LCD device for minimizing the moire.

As seen in FIG. 12(a), a red (R) sub-pixel, a green (G) sub-pixel, and a blue (B) sub-pixel are formed in the liquid crystal panel 2. One pixel is formed by a combination of the red (R) sub-pixel, green (G) sub-pixel, and blue (B) sub-pixel. Each pixel may be defined by a combination of the sub-pixels of three colors, but may be defined by a combination of sub-pixels of four colors depending on a case.

The pixel is arranged in plurality in a first direction (for example, a Y-direction) and a second direction (for example, a X-direction). Here, a size of the pixel is decided based on a usability of the liquid crystal panel 2. When the size of the pixel is decided, a pitch between the plurality of pixels is decided.

In the specification, a pitch between some elements denotes a distance between central portions of two elements which are adjacent to each other in the first direction or the second direction. Referring to FIG. 12(a), a pitch between a plurality of pixels in the Y-direction becomes P1a, and a pitch between a plurality of pixels in the X-direction becomes P1b.

As seen in FIG. 12(b), the protrusion pattern 110 is formed at the bottom 100c of the light guide plate 100.

The protrusion pattern 110 is arranged in plurality in the first direction (for example, the Y-direction) and the second direction (for example, the X-direction). The plurality of protrusion patterns 110 are arranged at pitches of P2a in the Y-direction, and arranged at pitches of P2b in the X-direction.

When the pitches P2a and P2b between the plurality of protrusion patterns are appropriately set in consideration of the pitches P1a and P1b between the plurality of pixels, moire can be prevented. A detailed description on this will now be made.

Hereinafter, a pattern pitch denotes a pitch between a plurality of protrusion patterns, and a pixel pitch denotes a pitch between a plurality of pixels.

As seen in FIG. 12(c), a plurality of pixels are arranged at pixel pitches P1, and a plurality of protrusion patterns are arranged at pattern pitches P2. Although a directionality of the Y-direction or X-direction is not shown in FIG. 12(c), when the pixel pitch P1 is a pitch in the Y-direction, the pattern pitch P2 also denotes the same pitch in the Y-direction, and when the pixel pitch P1 is a pitch in the X-direction, the pattern pitch P2 also denotes the same pitch in the X-direction.

Here, when the pixel pitch P1 is repeated n times (where n is an integer equal to or more than one), the pattern pitch P2 may be repeated n+m times (where n is an integer equal to or more than one, and m is an integer), and thus, a distance corresponding to n times of the pixel pitch P1 or n+m times of the pattern pitch P2 is a moire pitch Pm in which moire is repeated.

Such details may be expressed as the following Equations 1 and 2, and thus, the moire pitch Pm may be defined as the following Equation 3.

$$Pm/P1 = n \quad (1)$$

$$Pm/P2 = n + m = Pm/P1 + m \quad (2)$$

$$Pm = m\frac{P1 \times P2}{P1 - P2} \quad (3)$$

where m is an integer.

Here, when the moire pitch Pm is minimized to approximate zero, a user cannot recognize moire. In more detail, when moire pitch Pm is equal to or less than 500 μm, the user cannot recognize moire. Such a range of the moire pitch Pm is more preferable when the liquid crystal panel 2 is in HD+ Class.

In addition, when the moire pitch Pm is maximized to approximate ∞, the user cannot recognize moire. Especially, when the moire pitch Pm is equal to or greater than a length of the liquid crystal panel 2, moire is prevented from occurring. For example, when the moire pitch Pm in the Y-direction is equal to or greater than a length of the liquid crystal panel 2 in the Y-direction, moire cannot occur.

Figure 13:
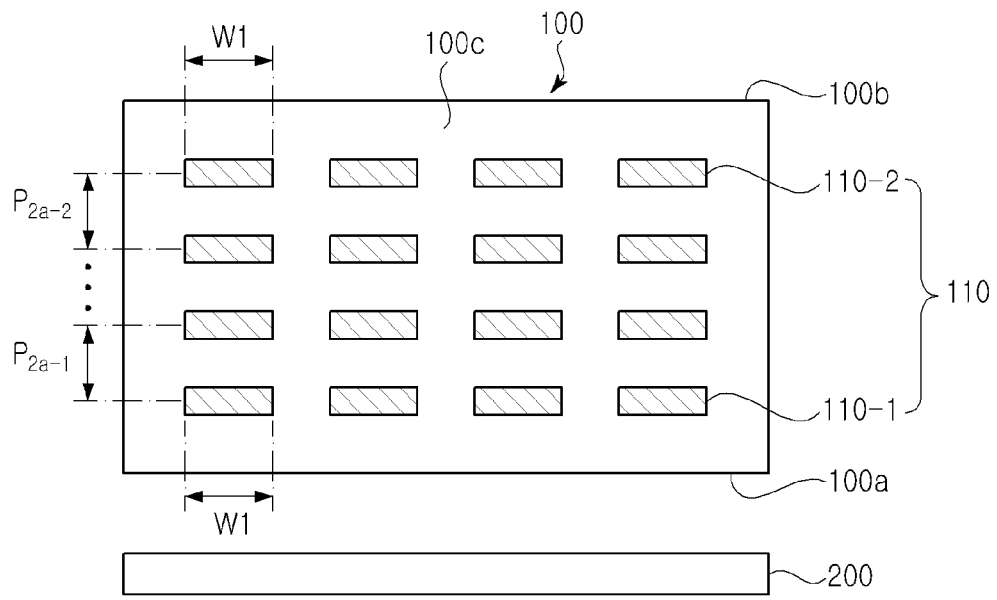
FIG. 13 illustrates a bottom of a light guide plate according to another embodiment of the present invention.

FIG. 13 illustrates a bottom of a light guide plate according to another embodiment of the present invention.

As seen in FIG. 13, a light guide plate 100 includes a first side surface 100a facing a light source 200 and a second side surface 100b opposite to the first side surface 100a.

A plurality of protrusion patterns 110 are formed at the bottom 100c of the light guide plate 100. For convenience, the protrusion pattern 110 in a row closest to the first side surface 100a is referred to as a first protrusion pattern 110-1, and the protrusion pattern 110 in a row closest to the second side surface 100b is referred to as a second protrusion pattern 110-2.

The plurality of protrusion patterns 110 are separated from each other and arranged in a plurality of rows from the first side surface 100a to the second side surface 100b. And, a plurality of protrusion patterns 110 are separated from each other and arranged in each of the plurality of rows.

In this case, a first width W1 of the first protrusion pattern 110-1 is the same as a first width W1 of the second protrusion pattern 110-2. Here, the first width W1 denotes a width of a side parallel to the first side surface 100a among the widths of the first and second protrusion patterns 110-1 and 110-2. Also, the protrusion patterns in all the rows have the same first width W1.

Moreover, a pattern pitch P2a-1 between the protrusion patterns 110 in two rows close to the first side surface 100a is the same as a pattern pitch P2a-2 between the protrusion patterns 110 in two rows close to the second side surface 100b. In addition, the pattern pitches in all the rows from the first side surface 100a to the second side surface 100b are the same.

As a result, according to FIG. 13, the protrusion patterns in all the rows have the same shape, and are arranged at equal intervals.

Figure 14:
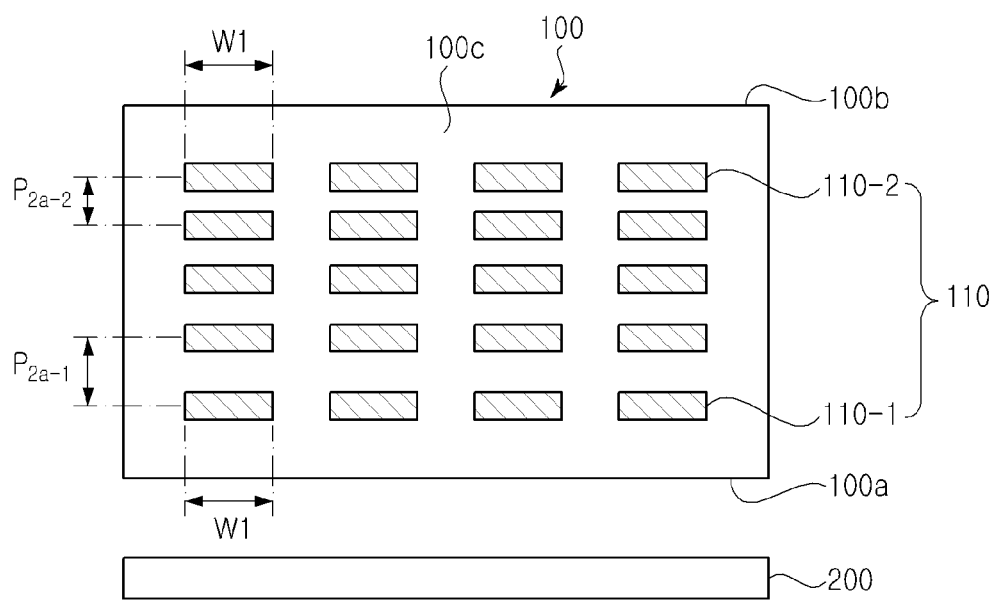
FIG. 14 is a schematic view of a bottom of a light guide plate according to another embodiment of the present invention.

FIG. 14 is a schematic view of a bottom of a light guide plate according to another embodiment of the present invention. In the following description, a description repetitive of the same elements as FIG. 13 is not provided.

As seen in FIG. 14, the first width W1 of the first protrusion pattern 110-1 is the same as the first width W1 of the second protrusion pattern 110-2. Also, protrusion patterns in all rows have the same first width W1.

However, the pattern pitch P2a-1 between the protrusion patterns 110 in two rows close to the first side surface 100a is larger than the pattern pitch P2a-2 between the protrusion patterns 110 in two rows far away from the first side surface 100a, for example, between the protrusion patterns 110 in two rows close to the second side surface 100b. That is, a relatively greater pattern pitch is set at a side close to the light source 200, and a relatively smaller pattern pitch is set at a side far away from the light source 200, whereby uniform light can be emitted all over the light guide plate. To provide an additional description, since a side far away from the light source 200 is relatively small in amount of light transferred thereto, the pattern pitch is set smaller, thus increasing an amount of light emitted toward an upper portion.

The pattern pitches may be set to be progressively reduced from the first side surface 100a to the second side surface 100b.

Figure 15:
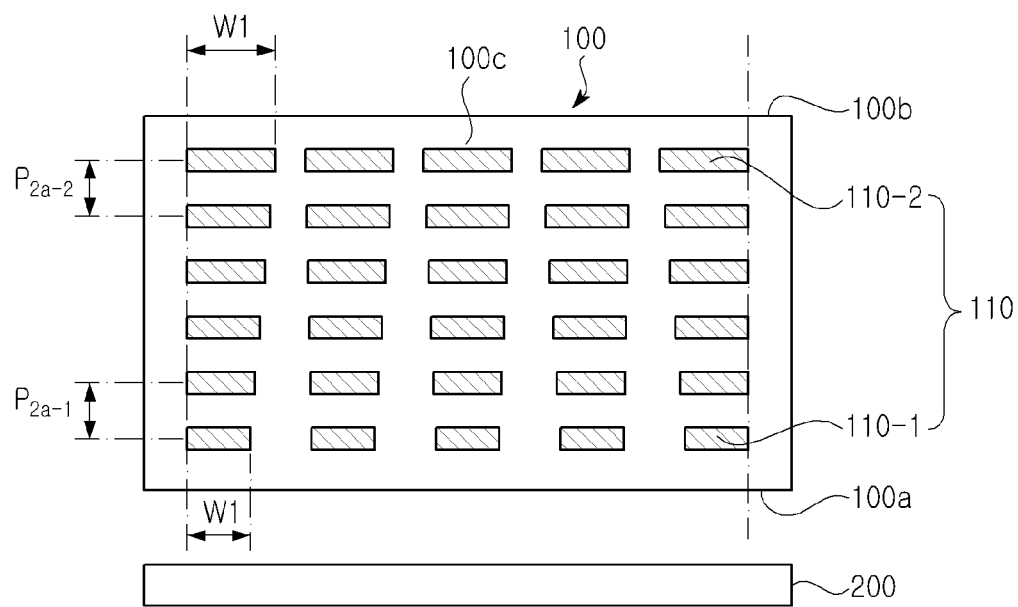
FIG. 15 is a schematic view of a bottom of a light guide plate according to another embodiment of the present invention.

FIG. 15 is a schematic view of a bottom of a light guide plate according to another embodiment of the present invention. In the following description, a description repetitive of the same elements as FIG. 13 is not provided.

As seen in FIG. 15, the pattern pitch P2a-1 between the protrusion patterns 110 in two rows close to the first side surface 100a is the same as the pattern pitch P2a-2 between the protrusion patterns 110 in two rows close to the second side surface 100b. Also, the pattern pitches in all the rows from the first side surface 100a to the second side surface 100b are the same.

However, the first width W1 of the first protrusion pattern 110-1 is smaller than the first width W1 of the second protrusion pattern 110-2. That is, the relatively smaller first width of the protrusion pattern is set at a side close to the light source 200, and the relatively greater first width of the protrusion pattern is set at a side far away from the light source 200, whereby uniform light can be emitted all over the light guide plate. To provide an additional description, since a side far away from the light source 200 is relatively small in amount of light transferred thereto, the first width of the protrusion pattern is set greatly, thus increasing an amount of light emitted toward an upper portion.

The first width of the protrusion pattern may be set to progressively increase from the first side surface 100a to the second side surface 100b.

Here, a distal end of the first protrusion pattern 110-1 and a distal end of the second protrusion pattern 110-2, more specifically, the distal end of the first protrusion pattern 110-1 and the distal end of the second protrusion pattern 110-2 at other side of the light guide plate 100 which does not face the light source 200, may be preferably arranged on one straight line for preventing moire. That is, when the distal end of the first protrusion pattern 110-1 and the distal end of the second protrusion pattern 110-2 are arranged on one straight line, an area in which the protrusion pattern is not formed in the entire bottom of the light guide plate has a pattern stepped with respect to the first side surface 100a, thus easily preventing moire.

Figure 16:
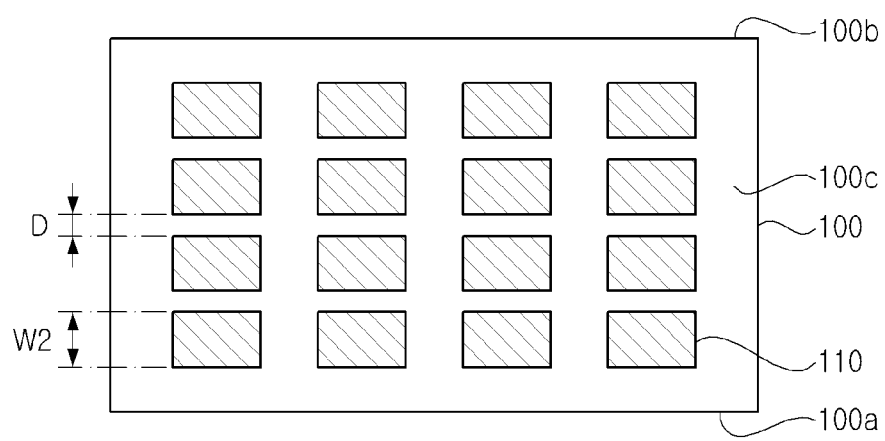
FIG. 16 is a schematic view of a bottom of a light guide plate according to another embodiment of the present invention.

FIG. 16 is a schematic view of a bottom of a light guide plate according to another embodiment of the present invention.

According to FIG. 16, a second width W2 of the protrusion pattern 110 is greater than a width D of a separated space between the plurality of protrusion patterns 110. Here, the second width W2 of the protrusion pattern 110 denotes a width of a side vertical to the first side surface 100a among the widths of the protrusion patterns 110.

That is, as in the embodiments of FIGS. 13 to 15, the second width W2 of the protrusion pattern 110 may be smaller than the width D of the separated space between the plurality of protrusion patterns 110, but as in FIG. 16, the second width W2 of the protrusion pattern 110 may be set greater than the width D of the separated space between the plurality of protrusion patterns 110.

The detailed arrangement of the protrusion patterns 110 in FIG. 16 may be variously changed as in FIGS. 13 to 15, and its repetitive description is not provided.

According to the present invention, the protrusion pattern is formed on the bottom of the light guide plate to have the triangular cross-sectional structure or a tetragonal cross-sectional structure, and the second angle between the first side and third side far away from the light source is formed smaller than the first angle between the first side and second side close to the light source, thus increasing an amount of light traveling to the top of the light guide plate to enhance a light efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
 a light source;
 a light guide plate facing the light source;
 a plurality of protrusion patterns provided on the bottom of the light guide plate;
 an optical sheet disposed on the light guide plate;
 a plurality of protective patterns formed between the plurality of protrusion patterns, wherein a height of each of the protective patterns is higher than a height of each of the protrusion patterns and each of the protective patterns is formed in a curved cross-sectional structure,
 wherein a major axis of each of the protrusion patterns is perpendicular to major axis of each of the protective patterns; and
 a reflector disposed under the light guide plate,
 wherein the light guide plate comprises a first side surface that faces the light source and acts as a light incident surface; a second side surface that is opposite to the first side surface; a bottom that faces the reflector; and a top that is opposite to the bottom and acts as a light output surface,
 wherein each of the plurality of protrusion patterns has a cross-sectional structure comprising a first side that is a portion of the bottom of the light guide plate, a second side that extends from one end of the first side, and a third side that extends from the other end of the first side, and
 wherein the second side is a side close to the light source, the third side is a side far away from the light source, and a second angle between the first side and the third side is smaller than a first angle between the first side and the second side.

2. The backlight unit of claim 1, wherein the second angle is greater than 0 degrees and smaller than 10 degrees.

3. The backlight unit of claim 1, wherein the cross-sectional structure of each protrusion pattern further comprises a fourth side that connects the second side to the third side.

4. The backlight unit of claim 1, further comprising a concave pattern formed at the top of the light guide plate,
 wherein the concave pattern is formed in a straight line structure vertical to the first side surface, and the concave pattern having the straight line structure is arranged in plurality at certain intervals.

5. The backlight unit of claim 4, further comprising a convex pattern formed in an area between the concave patterns,
   wherein the convex pattern is formed in a straight line structure vertical to the first side surface, and the convex pattern having the straight line structure is arranged in plurality at certain intervals.

6. The backlight unit of claim 5, wherein,
   the convex pattern comprises a first convex pattern and a second convex pattern, and
   a height of the first convex pattern is higher than a height of the second convex pattern.

7. The backlight unit of claim 1, wherein each of the protrusion patterns is formed in a tetragonal plane structure.

8. The backlight unit of claim 1, wherein,
   the optical sheet comprises a reverse prism sheet in which a prism structure is disposed to face the top of the light guide plate,
   the reverse prism sheet comprises a first prism pattern and a second prism pattern, and
   a height of the first prism pattern is higher than a height of the second prism pattern.

9. The backlight unit of claim 1, wherein the plurality of protective patterns are formed in a stripe pattern and each of the protective patterns includes a side that is adjacent to a plurality of protrusion patterns.

10. A liquid crystal display (LCD) device comprising:
    a backlight unit; and
    a liquid crystal panel disposed on the backlight unit,
    wherein the backlight unit comprising:
    a light source;
    a light guide plate facing the light source;
    a plurality of protrusion patterns provided on the bottom of the light guide plate;
    an optical sheet disposed on the light guide plate; and
    a reflector disposed under the light guide plate,
    wherein the light guide plate comprises a first side surface that faces the light source and acts as a light incident surface; a second side surface that is opposite to the first side surface; a bottom that faces the reflector; and a top that is opposite to the bottom and acts as a light output surface,
    wherein each of the plurality of protrusion patterns has a cross-sectional structure comprising a first side that is a portion of the bottom of the light guide plate, a second side that extends from one end of the first side, and a third side that extends from the other end of the first side,
    wherein the second side is a side close to the light source, the third side is a side far away from the light source, and a second angle between the first side and the third side is smaller than a first angle between the first side and the second side, and
    wherein,
    a plurality of pixels are arranged at certain pixel pitches (P1) in a first direction in the liquid crystal panel,
    the plurality of protrusion patterns on the light guide plate are arranged at certain pattern pitches (P2) in the first direction, and
    the pixel pitch (P1) and the pattern pitch (P2) are set such that a moire pitch (Pm) defined as the following Equation is equal to or less than 500 μm:

$$Pm = m\frac{P1 \times P2}{P1 - P2}$$

where m is an integer.

11. The LCD device of claim 10, further comprising an optical sheet disposed on the light guide plate and a plurality of protective patterns formed between the plurality of protrusion patterns,
    wherein a height of each of the protective patterns is higher than a height of each of the protrusion patterns and each of the protective patterns is formed in a curved cross-sectional structure.

12. The LCD device of claim 10, wherein each of the protrusion patterns is formed in a trapezoid cross-sectional structure in a plane view of a major surface of the light guide plate, and
    wherein a width, parallel to the first side surface of the light guide plate, of each of the protrusion patterns increases as the protrusion patterns are nearer to the second side surface of the light guide plate.

13. The LCD device of claim 11, wherein a major axis of each of the protrusion patterns is perpendicular to a major axis of each of the protective patterns.

14. A liquid crystal display (LCD) device comprising:
    a backlight unit; and
    a liquid crystal panel disposed on the backlight unit,
    wherein the backlight unit comprises:
    a light source;
    a light guide plate facing the light source;
    a plurality of protrusion patterns provided on a bottom of the light guide plate;
    an optical sheet disposed on the light guide plate; and
    a reflector disposed under the light guide plate,
    wherein the light guide plate comprises a first side surface that faces the light source and acts as a light incident surface; a second side surface that is opposite to the first side surface; a bottom that faces the reflector; and a top that is opposite to the bottom and acts as a light output surface,
    wherein each of the plurality of protrusion patterns has a cross-sectional structure comptising a first side that is a portion of the bottom of the light guide plate, a second side that extends from one end of the first side, and a third side that extends from the other end of the first side,
    wherein the second side is a side close to the light source, the third side is a side far away from the light source, and a second angle between the first side and the third side is smaller than a first angle between the first side and the second side, and
    wherein,
    a plurality of pixels are arranged at certain pixel pitches (P1) in a first direction in the liquid crystal panel,
    the plurality of protrusion patterns on the light guide plate are arranged at certain pattern pitches (P2) in the first direction, and
    the pixel pitch (P1) and the pattern pitch (P2) are set such that a moire pitch (Pm) defined as the following Equation is equal to or more than a length of the liquid crystal panel in the first direction:

$$Pm = m\frac{P1 \times P2}{P1 - P2}$$

where m is an integer.

15. The LCD device of claim 14, further comprising an optical sheet disposed on the light guide plate and a plurality of protective patterns formed between the plurality of protrusion patterns, wherein a height of each of the protective patterns is higher than a height of each of the protrusion patterns and each of the protective patterns is formed in a curved cross-sectional structure.

16. The LCD device of claim 14, wherein each of the protrusion patterns is formed in a trapezoid cross-sectional structure in a plane view of a major surface of the light guide plate, and
wherein a width, parallel to the first side surface of the light guide plate, of each of the protrusion patterns increases as the protrusion patterns are nearer to the second side surface of the light guide plate.

17. The LCD device of claim 15, wherein a major axis of each of the protrusion patterns is perpendicular to a major axis of each of the protective patterns.

18. A backlight unit comprising:
a light source;
a light guide plate facing the light source
a plurality of protrusion patterns provided on a bottom of the light guide plate; and
a reflector disposed under the light guide plate,
wherein the light guide plate comprises a first side surface that faces the light source and acts as a light incident surface; a second side surface that is opposite to the first side surface; a bottom that faces the reflector; and a top that is opposite to the bottom and acts as a light output surface,
wherein each of the plurality of protrusion patterns has a cross-sectional structure comprising a first side that is a portion of the bottom of the light guide plate, a second side that extends from one end of the first side, and a third side that extends from the other end of the first side,
wherein the second side is a side close to the light source, the third side is a side far away from the light source, and a second angle between the first side and the third side is smaller than a first angle between the first side and the second side,
wherein each of the protrusion patterns is formed in a trapezoid cross-sectional structure in a plane view of a major surface of the light guide plate, and
wherein a width, parallel to the first side surface of the light guide plate, of each of the protrusion patterns increases as the protrusion patterns are nearer to the second side surface of the light guide plate.

19. The backlight unit of claim 18, further comprising a plurality of protective patterns formed between the plurality of protrusion patterns,
wherein a height of each of the protective patterns is higher than a height of each of the protrusion patterns and each of the protective patterns is formed in a curved cross-sectional structure, and
wherein a major axis of each of the protrusion patterns is perpendicular to a major axis of each of the protective patterns.

* * * * *